(No Model.) 6 Sheets—Sheet 4.
J. MACKSEY, W. HELMER & G. E. BARTON.
APPARATUS FOR MAKING CARBONATED BEVERAGES.
No. 518,577. Patented Apr. 17, 1894.
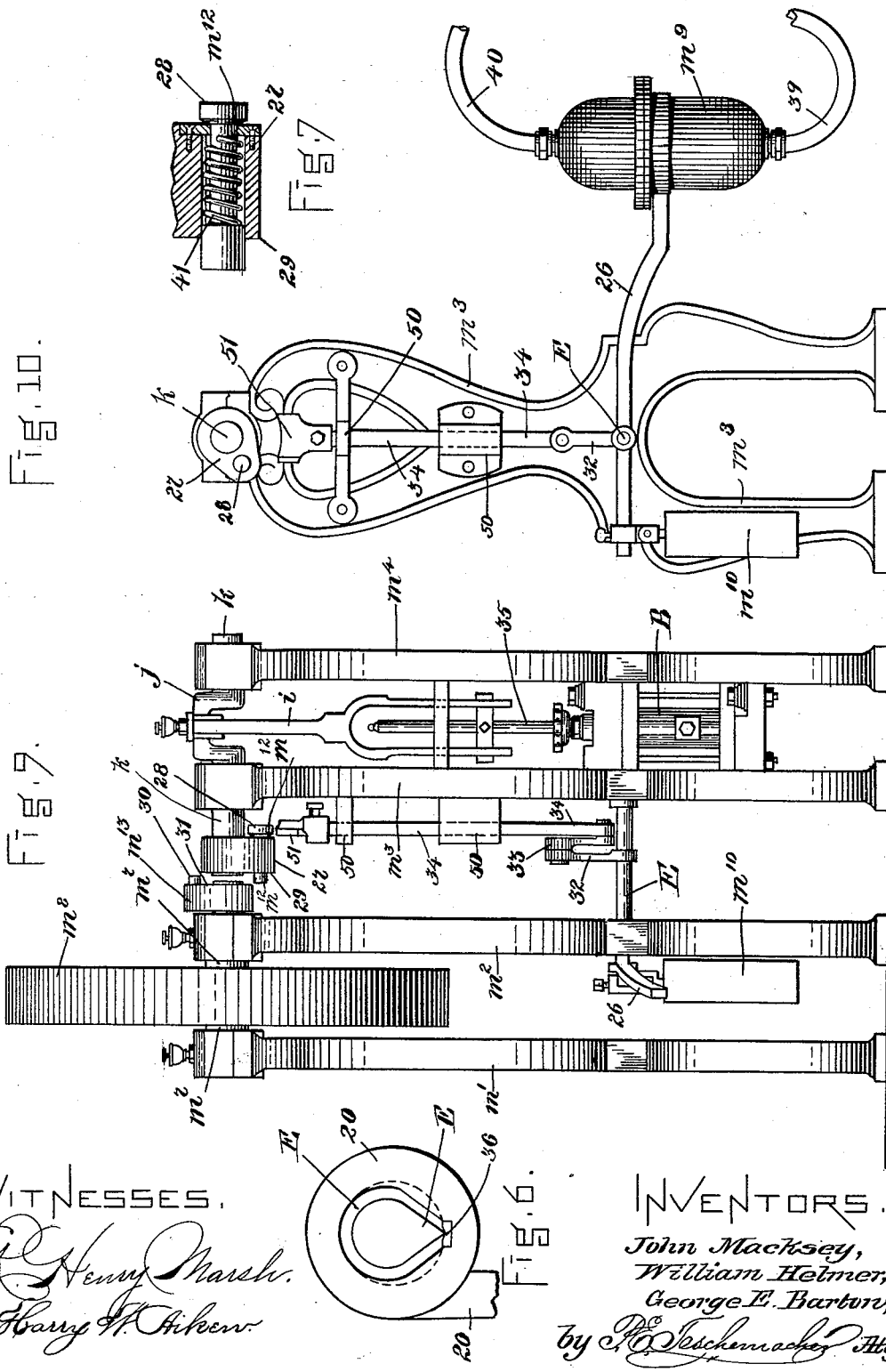
WITNESSES.
Henry Marsh.
Harry W. Aiken.
INVENTORS.
John Macksey,
William Helmer,
George E. Barton,
by Teschemacher Atty.

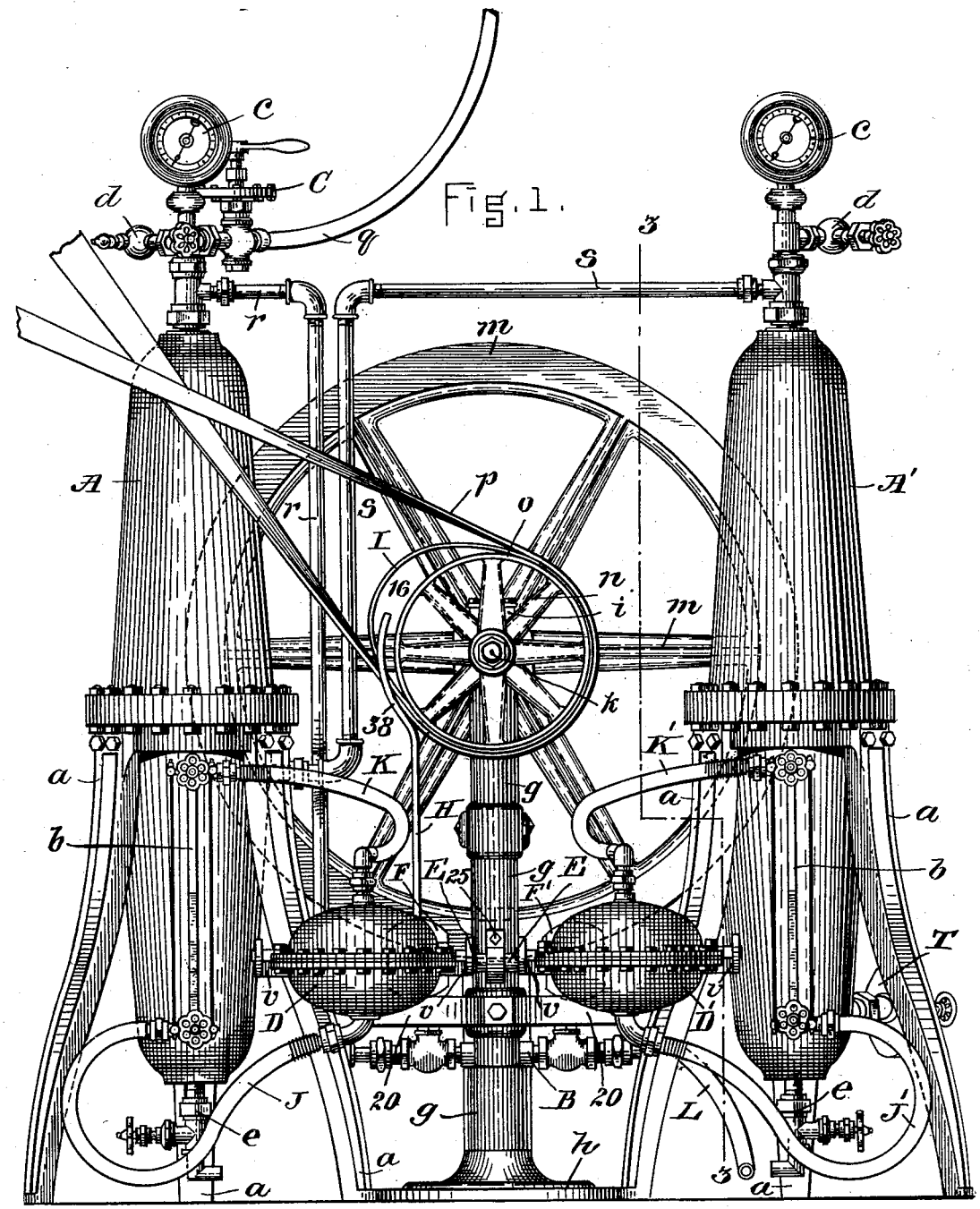

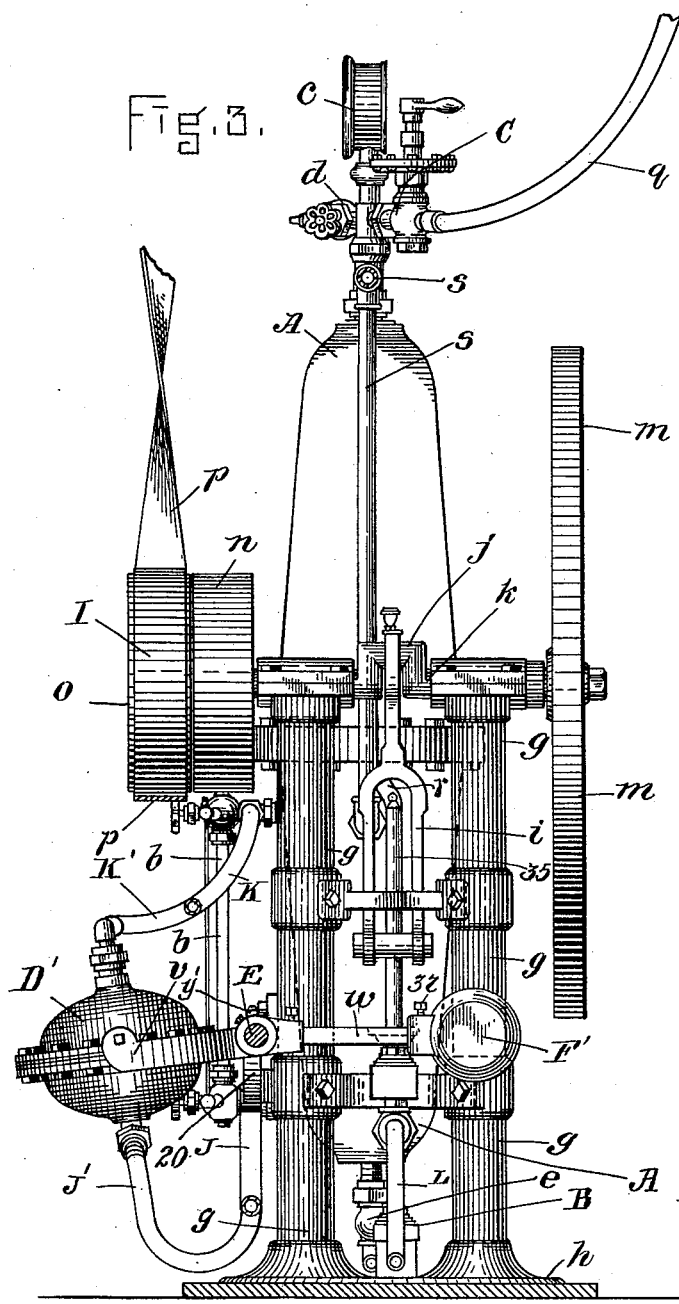

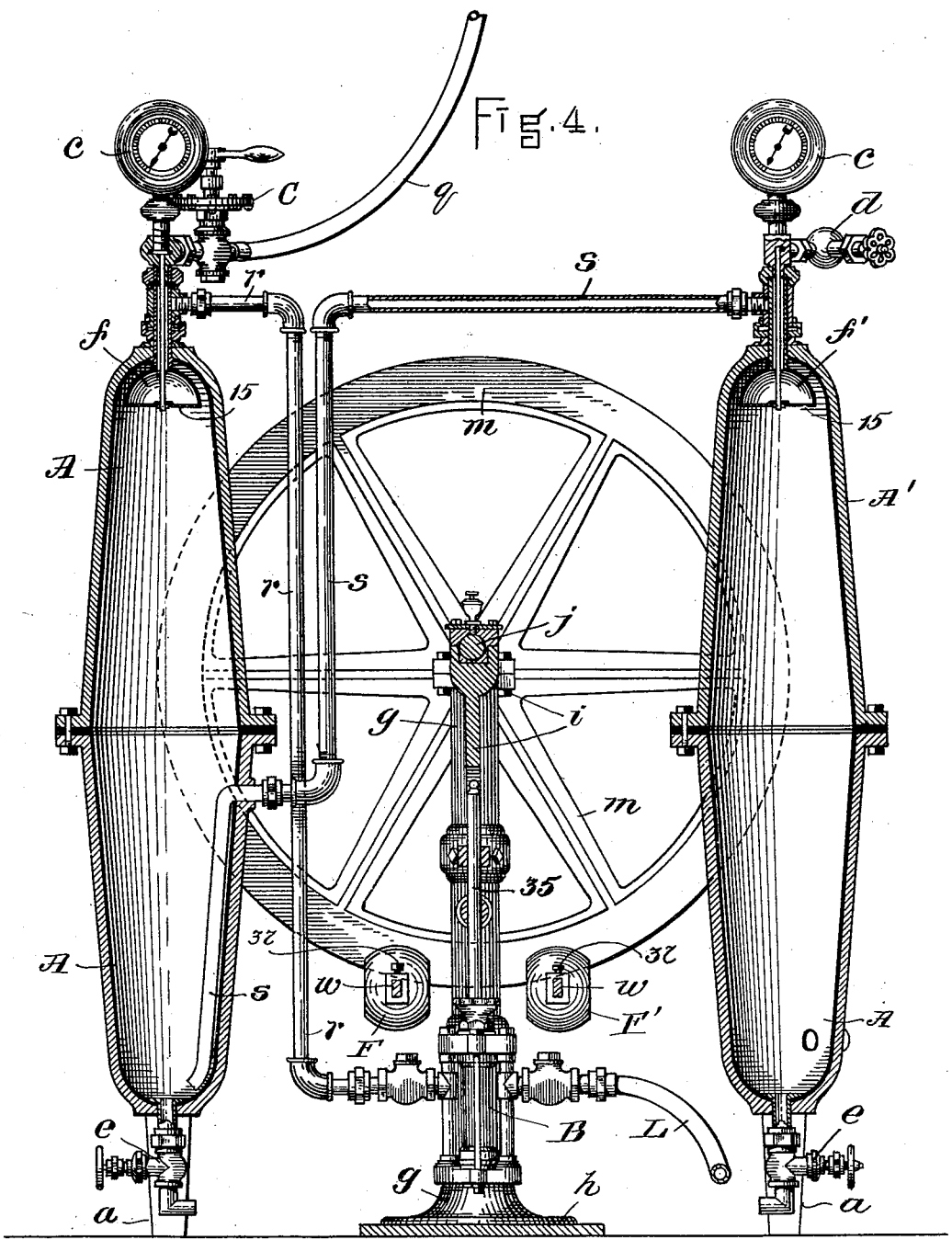

(No Model.) 6 Sheets—Sheet 5.
J. MACKSEY, W. HELMER & G. E. BARTON.
APPARATUS FOR MAKING CARBONATED BEVERAGES.
No. 518,577. Patented Apr. 17, 1894.
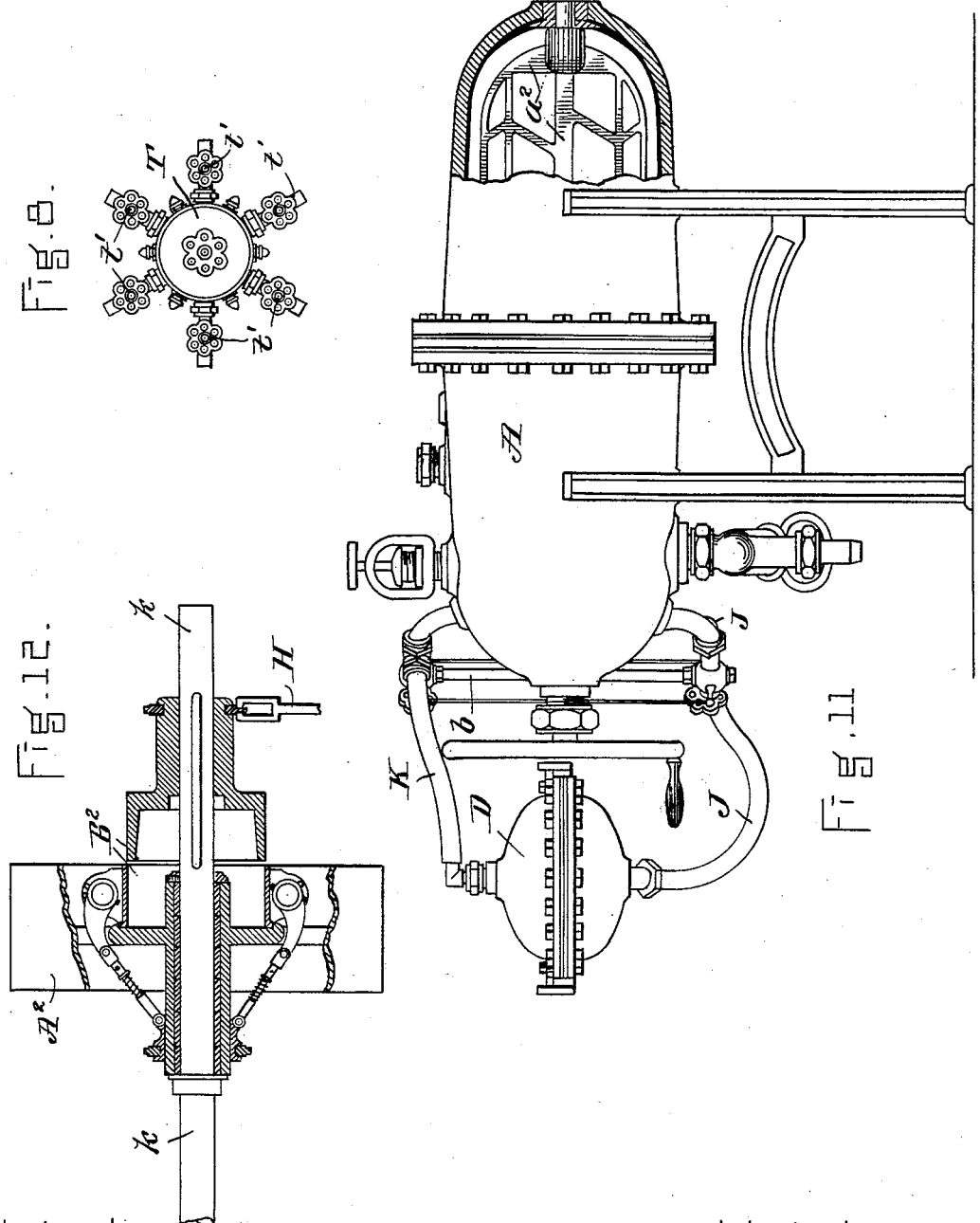
WITNESSES.
Henry Marsh.
Harry W. Aiken.
INVENTORS.
John Macksey,
William Helmer,
George E. Barton,
by Teschemacher
Atty.
THE NATIONAL LITHOGRAPHING COMPANY,
WASHINGTON, D. C.

(No Model.) 6 Sheets—Sheet 6.

J. MACKSEY, W. HELMER & G. E. BARTON.
APPARATUS FOR MAKING CARBONATED BEVERAGES.

No. 518,577. Patented Apr. 17, 1894.

WITNESSES.
R. Henry Marsh.
Harry H. Aiken.

INVENTORS.
John Macksey,
William Helmer,
George E. Barton,
by J. E. Tephemacher
Att'y

THE NATIONAL LITHOGRAPHING COMPANY,
WASHINGTON, D. C.

UNITED STATES PATENT OFFICE.

JOHN MACKSEY AND WILLIAM HELMER, OF BOSTON, AND GEORGE E. BARTON, OF SOMERVILLE, ASSIGNORS TO THE AMERICAN SODA FOUNTAIN COMPANY, OF BOSTON, MASSACHUSETTS.

APPARATUS FOR MAKING CARBONATED BEVERAGES.

SPECIFICATION forming part of Letters Patent No. 518,577, dated April 17, 1894.

Application filed January 4, 1894. Serial No. 495,710. (No model.)

*To all whom it may concern:*

Be it known that we, JOHN MACKSEY and WILLIAM HELMER, residing at Boston, in the county of Suffolk, and GEORGE E. BARTON, residing at Somerville, in the county of Middlesex, State of Massachusetts, citizens of the United States, have invented certain Improvements in Apparatus for Making Carbonated Beverages, of which the following is a full, clear, and exact description, reference being had to the accompanying drawings, making part of this specification, in which—

Figure 2:
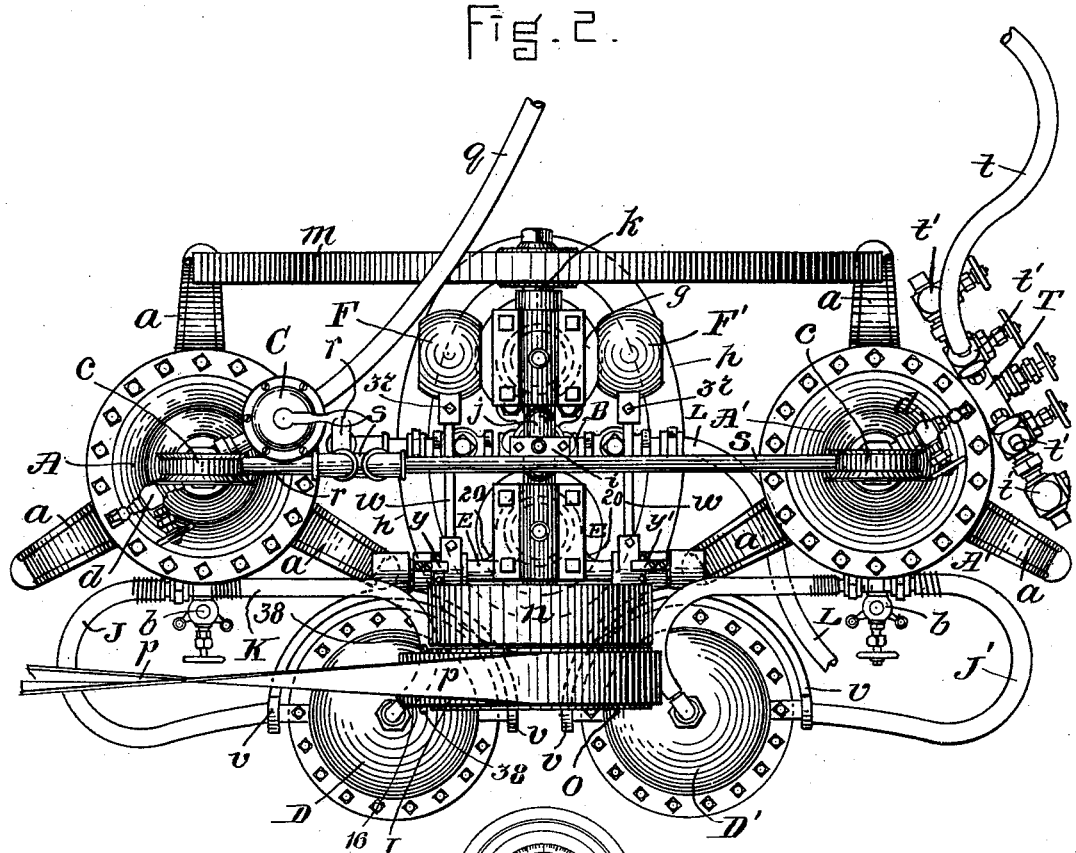
Figure 5:
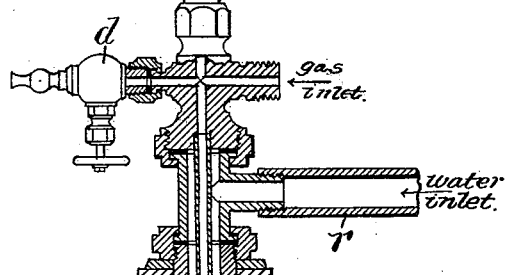

Figure 1 is a front elevation of our improved apparatus for making carbonated beverages. Fig. 2 is a plan of the same. Fig. 3 is a transverse vertical section of the same on the line 3, 3, of Fig. 1. Fig. 4 is a longitudinal vertical section through the center of the apparatus. Fig. 5 is an enlarged sectional detail of the upper portion of one of the mixing vessels and the spraying-device therein. Figs. 6, 7, and 8 are details to be referred to. Fig. 9 and 10 are front and side elevations of a modification of our invention. Fig. 11 is a sectional elevation of another modification to be referred to. Fig. 12 is a view of a clutch to be referred to.

Our invention relates to an apparatus in which carbonic acid gas under pressure is taken from any suitable source of supply and combined with water or other liquid to produce a beverage, the liquid being forced by a pump into a vessel containing gas, in which vessel it is sprayed, or beaten with a revolving paddle or agitator; and our invention has for its object the improvement of apparatus for making carbonated beverages whereby the liquid is caused to absorb a greater quantity of gas than has heretofore been found possible with machines of this character as previously constructed, and whereby also the apparatus is made self-governing, the working parts rendered visible and accessible for examination and adjustment, the construction simplified, the noise and wear and tear during operation lessened, and the cost of manufacture reduced.

To this end our invention consists in an apparatus embodying a mixing-vessel in which liquid and gas are combined, a pump for forcing liquid into said vessel, and a device for automatically starting and stopping the pump for the purpose of controlling the supply of liquid to said mixing-vessel, together with the necessary spraying devices, paddles, or agitators, valves, gages and pipes, constructed and arranged to cause, govern and indicate the operation of the apparatus, as hereinafter fully described and specifically pointed out in the claims.

In the said drawings, A, A', represent two mixing-vessels capable of sustaining heavy pressure, said vessels being supported on legs $a$, and each being provided with a glass water gage $b$, a pressure gage $c$, a vent-cock or air valve $d$, a blow-off cock $e$, and an internal spraying-head or device to be hereinafter described.

B is a double acting suction and force pump supported and suitably secured in place between columns or standards $g$, $g$, which are cast integral with a common base $h$, the piston rod 35 of said pump being connected by a rod $i$ with a crank $j$ on the driving shaft $k$ which is supported in suitable bearings secured to the upper ends of the columns $g$, said shaft $k$ carrying a fly wheel $m$, and fast and loose pulleys $n$, $o$, over which passes a belt $p$, by which motion is transmitted in the usual manner.

C is an automatic regulating or reducing valve of any suitable or approved construction which may be set to maintain any desired pressure, closing when the pressure in the mixing-vessels reaches the desired point, and opening when the pressure in the mixing-vessels falls below the said point; carbonic-acid gas being supplied to the valve C through an inlet pipe $q$ at a pressure higher than that required in the finished beverage, from a generator, not shown or other source of supply.

L is a suction-pipe through which the pump B draws liquid which is forced by said pump through a pipe $r$ into the primary mixing-vessel A, said pipe $r$ being connected with a spraying-head or device $f$, Figs. 4 and 5, located within said vessel at or near its upper end, and consisting preferably of a chamber of hemispherical form having its flat lower side provided with a series of small jet-holes 15 through which the liquid is discharged, falling in a fine spray or shower to the bottom of the vessel A and through the gas under pressure with which said vessel is charged, becoming thereby mixed and impregnated with the same, as required.

s is a pipe connected with the vessel A and extending from near its bottom to the top of the interior of the secondary mixing-vessel A' at which point it is connected with a spraying-head f' similar to that within the upper end of the vessel A, the partially carbonated liquid passing from said vessel A through the pipe s into the vessel A' within which it is again sprayed and completely saturated with gas, falling to the bottom of the vessel A', from which it is drawn off through a distributing device T, Figs. 2 and 8, which is provided with a series of radial distributing pipes t, each having a valve t' to control the supply of carbonated liquid to the bottling table or draft apparatus, not shown, with which it is connected. Instead of minutely subdividing the liquid as it enters the mixing vessels A and A' by passing it through spraying-devices as above described, the same result may be effected by means of revolving paddles or agitators placed within said mixing-vessels, in which case the latter would preferably be arranged horizontally instead of vertically, as shown in Fig. 11, which represents a mixing-vessel provided with a revolving paddle $a^2$, which we regard as the full mechanical equivalent of the spraying-device previously described.

To control the supply of liquid to the vessels A and A', we employ a device for automatically starting and stopping the pump, which device consists of two vessels D and D', each of which is supported in a yoke or bifurcated bracket v, projecting from a rock-shaft E which turns on knife edges 36, as shown in detail in Fig. 6, the said vessels D D', being counterbalanced by weights F, F', made adjustable upon arms w secured to the rock-shaft E, said weights being held in place when adjusted by set screws 37. It is obvious however that a single weighted arm may be used if preferred, although we prefer to employ two weighted arms as shown, as the weight is thereby more evenly distributed upon the rock-shaft E. The rock shaft E is supported by a bracket 20 securely bolted to the front column g, and its oscillation in either direction is limited by stops y, y', and a central stop consisting of a set-screw 25 adapted to take a bearing against the front column g.

H is an arm attached to the rock shaft E, and carrying at its upper end a fork or belt-shipper 38 by which the belt p is shipped from the loose pulley o to the fast or driving pulley n, and vice versa.

I is a loose friction belt interposed between the driving belt p under which it runs, and the pulleys o and n, said friction belt being shifted by the fork 38 from one pulley to the other at the same time that the driving belt p is shifted, the loose portion 16 of the belt I running between the forks of the belt-shipper as shown in Figs. 1 and 2. The usual tendency of a belt to shriek when passing from a loose to a fast pulley is well known. It is due to the slipping of the belt upon the fast pulley before it has been shipped far enough upon said fast pulley to produce sufficient friction to overcome the inertia of the fly-wheel and the various working parts of the pump. In a machine of this character where the belt is necessarily shipped very slowly, this shriek is intensified and drawn out to a great length. We have entirely overcome this difficulty by the employment of the loose belt I, which enables our automatic belt-shipper to shift the belt from the loose to the fast pulley without the slightest sound.

J and J' are flexible tubes through which the liquid from the vessels A and A' passes into the vessels D and D' respectively and back again as the level of the liquid varies in said vessels A and A'; and K, K', are similar flexible tubes through which air or gas displaced by the movement of the liquid may flow freely from the vessels A and A' to the vessels D and D' respectively and back again as the latter vessels become filled with liquid.

It will be apparent that the movement of the arm H may be utilized to operate a friction-clutch instead of shipping a belt, in which case the said clutch will replace one of the pulleys on the driving shaft, and will operate to connect and disconnect the shaft and pulley to start or stop the pump. A clutch of this description is shown in Fig. 12, in which $A^2$ represents the driving-pulley and $B^2$ the clutch of any suitable construction which is actuated to connect the pulley $A^2$ with the driving shaft k or disconnect it therefrom by means of the arm H on the rock-shaft E. It is also obvious that the movement of the rock-shaft E may be used to operate any one of the large variety of clutches in common use, by means of which two independent shafts are connected or disconnected. One such arrangement is shown in Figs. 9 and 10, in which $m'$, $m^2$, $m^3$, $m^4$, represent standards or frames which serve to support the rock-shaft E, the pump B, the crank-shaft k, and the pulley-shaft $m^7$, the latter carrying the driving pulley $m^8$ which also acts as a balance or fly-wheel. The rock-shaft E is operated in the same manner as the rock-shaft shown in Figs. 1, 2, and 3, by the ebb and flow of liquid in a vessel $m^9$, corresponding to one of the vessels D or D' previously described, and similarly connected with a mixing-vessel, not shown, by flexible tubes 39, 40, as shown in Fig. 10, said vessel $m^9$ being supported at one end of a lever 26 having at its opposite end a counterbalance weight $m^{10}$, corresponding to one of the weights F or F'.

The crank-shaft $k$ is provided at the end next adjacent to the end of the pulley shaft $m^7$ with a crank-arm 27 having a sliding pin $m^{12}$, Figs. 7 and 9, normally projecting beyond the face 29 of the arm 27 and provided at its opposite end with a head 28, said pin $m^{12}$ being thrust forward into the position shown in Figs. 7 and 9 by a spiral spring 41, Fig. 7, which encircles the pin $m^{12}$ within a socket or recess in the arm 27. The pulley shaft $m^7$ is also provided at the end next adjacent to the crank shaft with a crank arm $m^{13}$ similar to the arm 27 and having a stationary pin or projection 30 extending beyond its face 31, whereby when the pulley shaft is rotated, the pin 30 will engage the pin $m^{12}$, and thus communicate the motion of the pulley shaft to the crank shaft and pump-plunger connected therewith by the rod $i$.

The rock-shaft E has secured to it an arm 32, to the outer end of which is pivoted a link 33 which is pivoted at its lower end to a rod 34 which slides vertically in bearings 50 and carries at its upper end a curved wedge 51 which when thrust upward by the rocking of the shaft E, is engaged by the inner surface of the head 28 of the pin $m^{12}$, whereby the latter is withdrawn out of the path of the pin 30.

The counter balance weight $m^{10}$ normally holds the rock shaft E in such position that the wedge 51 will be drawn down as shown in Figs. 9 and 10, but when sufficient liquid flows into the vessel $m^9$ to overbalance the weight $m^{10}$, the shaft E will be rocked and through the connections described raise the rod 34 and wedge 51 into such a position that as the arm 27 revolves, the inner surface of the head 28 of the pin $m^{12}$ will strike the thin edge of the wedge 51 and slide along its curved and inclined surface, whereby the pin $m^{12}$ will be withdrawn from the path of the pin 30 on the arm $m^{13}$, thus breaking connection between the pulley-shaft $m^7$ and the crank-shaft $k$, and stopping the pump. When sufficient water flows out of the vessel $m^9$, the weight $m^{10}$ will overbalance the said vessel, causing the rock-shaft E to again turn, thereby withdrawing the wedge 51 into the position shown in Figs. 9 and 10, when the pin $m^{12}$ will be again thrust forward by its spring 41 into a position to be engaged by the pin 30, thus connecting the pulley-shaft with the crank-shaft and starting the pump.

We regard the above described clutch, and also that shown in Fig. 12 as the full mechanical equivalents of the belt-shipper and fast and loose pulleys first described, and intend to use either of said devices as may be found best suited to the circumstances of the case.

The operation of the machine is as follows: All the valves being closed except those above and below the glass water-gages $b$, carbonic-acid gas at a higher pressure than that required in the finished beverage is taken from a generator or other source of supply, and conducted through the pipe $q$ to the regulating valve C which is then gradually opened until the pressure-gages $c$ indicate the pressure desired in the finished beverage, say sixty pounds, which pressure, during subsequent operations, will be maintained by the automatic action of the regulating valve C. The air valves $d$ are next opened and the atmospheric air blown off, which being lighter than the carbonic-acid gas, has risen to the tops of the mixing vessels A and A'. When all the air has been expelled from said vessels, the valves $d$ are closed. Power is now applied by shipping the belt $p$ onto the fast pulley $n$, whereby the pump is set in motion, its operation drafting liquid through the pipe L from the street main, tank or other source of supply, and forcing it through the pipe $r$ and spraying-device $f$ into the primary mixing vessel A, within which it falls in a shower of tiny drops to the bottom, absorbing the carbonic-acid gas in large quantities in its descent, its minute subdivision presenting a large surface of liquid to the compressed gas which readily unites with it. As the liquid enters the mixing vessel A through the spraying device $f$, the pressure slowly increases by reason of the further compression of the gas by the entrance of the liquid, and the liquid partially saturated with gas is thereby forced through the pipe $s$ and spraying device $f'$ into the secondary mixing vessel A' within which it again falls in a shower through the compressed gas with which it becomes completely saturated. The valves $t'$ of the distributing device T may now be opened and the carbonated liquid drawn off to the bottling tables, dispensing apparatus, or portable storage tanks known to the trade as "fountains." As the water rises in the mixing vessels A and A', owing to the amount supplied by the pump being in excess of that drawn off for use at the bottling tables, &c., it flows over gradually through the flexible pipes J and J' into the vessels D and D', displacing the air or gas therein contained through the flexible pipes K and K', thereby increasing the weight of the vessels D and D' until it exceeds that of the counterbalance weights F and F'. Gravity now acts, causing the vessels D and D' to fall and turn the rock-shaft E upon its knife edges, thereby vibrating or moving the arm H and fork or belt-shipper 38, causing the belt to be shipped from the fast or driving pulley $n$ to the loose pulley $o$, when the operation of the pump will cease. Continued draft at the bottling table or dispensing apparatus quickly reduces the quantity of liquid in the mixing vessels A and A', and as the liquid level falls in the said mixing vessels it falls correspondingly in the vessels D and D', the liquid flowing back through the flexible pipes J and J' and being replaced by gas passing through the flexible pipes K and K'. This action lessens the weight of the vessels D and D' until it becomes less than that of the counterbalance weights F and F', when gravity again acts, rocking the shaft E in the opposite direction to ship the belt onto the fast pulley n, and again starting the pump. These operations are repeated automatically as long as power, gas and water are supplied to the machine.

The operation which replenishes the gas supply in the secondary mixing vessel A' is automatic and may be described as follows: The only inlet to the vessel A' is by means of the pipe s, the lower open end of which is within and near the bottom of the primary mixing-vessel A. When the gas is first admitted to the vessel A through the regulating valve C it immediately passes over into the vessel A' through the pipe s until an equilibrium of pressure is established. When the pump commences to deliver liquid into the vessel A, the end of the pipe s is quickly submerged and thereafter only liquid containing gas in solution can pass over to equalize the pressures in the vessels A and A'. As the pump delivers liquid into the vessel A faster than it is drawn off through the valves t' of the distributing device, and as it practically only passes from the vessel A to the vessel A' fast enough to replenish the draft at the said valves t', it is obvious that the liquid in the vessel A will rise more rapidly than in the vessel A'; therefore when the levels of liquid in the vessels A and A' have become sufficiently high to cause enough liquid to flow into the vessels D and D' to overbalance the weights F and F', ship the belt p and stop the pump for the first time, it will be found by examining the water-gages b and noting the level of the liquid in the vessels A and A' as indicated, that while the vessel D is nearly full of liquid, the vessel D' will contain but little. The capacities of the vessels D and D' are such however that either one, if full of liquid, will be heavy enough to outweigh and overbalance both of the weights F and F', even if the other one of said vessels contains no liquid, and consequently the level of the liquid in the vessel A is limited to that necessary to fill the vessel D. The liquid which passes from the vessel A to the vessel A' being but partially saturated with gas, absorbs more gas when sprayed into the vessel A', and as the lower end of the pipe s is submerged in the vessel A no free or undissolved gas to replace that so absorbed can pass over into the vessel A', the liquid in which will therefore by reason of the reduction of the quantity of gas therein, rise faster than that in the vessel A; consequently when the pump stops the second time it will be found that the liquid level in the vessel A has fallen and that in the vessel A' risen, and the quantities in the vessels D and D' have varied correspondingly, vessel D containing less liquid and vessel D' containing more than when the pump stopped the first time. When the pump stops the third time the levels will have again changed owing to the continued absorption of gas in the vessel A' and its replacement by charged liquid, the level in the vessels A and D having again fallen, and that in the vessels A' and D' having again risen still higher, and this series of changes continues until the liquid level in the vessel A' becomes high enough to fill or nearly fill the vessel D'. When this occurs the level in the vessel A will have become low, and as the gas is constantly replenished in the vessel A through the automatic action of the regulating valve C, and as the pump is held idle through the weight of the liquid in the vessel D', and the liquid continues to be drawn off from the vessel A' through the outlet valves t', the liquid is entirely driven out of the vessel A, and the gas eventually passes through the pipe s into the vessel A' to replace that which has been used, when, owing to the lowering of the level in the vessels A' and D', the pump will again start, the vessels A and D will again, as at first, fill more rapidly than the vessels A' and D', and the above described series of changes in the levels of the liquids will recommence.

What we claim as our invention, and desire to secure by Letters Patent, is—

1. In a machine for making carbonated beverages, the combination of a mixing vessel, a pipe for admitting gas to said mixing vessel, a pump for forcing liquid into said mixing vessel, a device for automatically starting and stopping the pump, said device controlling and being operated by the level of the liquid in the said mixing vessel, and a mixing device for subdividing the liquid in the mixing vessel containing gas under pressure, whereby the said gas and liquid are intimately mixed and combined within said vessel, substantially as set forth.

2. In a machine for making carbonated beverages, the combination of a mixing-vessel, a pipe for admitting gas to said mixing-vessel, a pump for forcing liquid into said mixing-vessel, a device for automatically starting and stopping the pump, said device controlling and being operated by the level of the liquid in the said mixing-vessel, a mixing-device arranged within said mixing-vessel, whereby the liquid is sub-divided within the mixing-vessel containing gas under pressure, and an automatic regulating valve, whereby a uniform pressure of gas is constantly maintained in the mixing-vessel, substantially as set forth.

3. In a machine for making carbonated beverages, the combination of a mixing-vessel, a pipe for admitting gas to said mixing-vessel, an automatic regulating valve for maintaining a uniform pressure of gas in said mixing-vessel, a pump for forcing liquid into said mixing-vessel, a mixing device arranged within said mixing-vessel, whereby the liquid is sub-divided within said mixing-vessel, a rock shaft carrying on one side a vessel and on the opposite side an arm provided with a counterbalance weight, the said vessel being connected with the mixing-vessel by flexible tubes and arranged to control the level of the liquid within the mixing-vessel by stopping the pump when the liquid has risen to the desired level, and starting it again when a predetermined low level is reached, substantially as set forth.

4. In a machine for making carbonated beverages, the combination of a mixing-vessel, a pipe for admitting gas to said mixing-vessel, an automatic regulating valve for maintaining a uniform pressure of gas in said mixing-vessel, a pump for forcing liquid into said mixing-vessel, a mixing-device arranged within said mixing vessel, whereby the liquid is sub-divided within said mixing-vessel, a rock-shaft carrying on one side a vessel and on the other side an arm provided with a counterbalance weight, the said vessel being connected with the mixing-vessel by flexible tubes and arranged to control the level of the liquid within the mixing-vessel by stopping the pump when the liquid has risen to the desired level and starting it again when a predetermined low level is reached, and a belt-shipper connected with said rock-shaft for shipping a belt and thereby stopping or starting the pump, substantially as described.

5. In a machine for making carbonated beverages, the combination of a mixing vessel, a pipe for admitting gas to said mixing-vessel, an automatic regulating valve for maintaining a uniform pressure of gas in said mixing-vessel, a pump for forcing liquid into said mixing-vessel, a mixing-device within said mixing-vessel, whereby the liquid is sub-divided within said mixing-vessel, a rock shaft carrying on one side a vessel and on the opposite side an arm provided with a counterbalance weight, the said vessel being connected with the mixing-vessel by flexible tubes and arranged to control the level of the liquid within the said mixing vessel by stopping the pump when the liquid has risen to the desired level, and starting it again when a predetermined low level is reached, and means substantially as described connected with said rock shaft for connecting the pump with the driving power or disconnecting it therefrom, substantially as set forth.

6. In a machine for making carbonated beverages, the combination of a mixing-vessel, a pipe for admitting gas to said mixing-vessel, an automatic regulating valve for maintaining a uniform pressure of gas in said mixing-vessel, a pump for forcing liquid into said mixing-vessel, a mixing-device arranged within said mixing vessel, whereby the liquid is sub-divided within said mixing-vessel, a rock-shaft carrying on one side a vessel and on the opposite side an arm provided with a counterbalance weight, the said vessel being connected with the mixing-vessel by flexible tubes and arranged to control the level of the liquid within the mixing-vessel by stopping the pump when the liquid has risen to the desired level, and starting it again when a predetermined low level is reached, a belt shipper connected with said rock-shaft for shipping a belt, and thereby stopping or starting the pump, and a loose friction belt interposed between the driving-belt and the pulley over which it runs for the purpose of preventing noise when said driving-belt is shipped from the loose to the fast pulley, substantially as described.

7. In a machine for making carbonated beverages, the combination of a primary mixing-vessel, a pipe for admitting gas to said mixing-vessel, a pump for forcing liquid into said mixing-vessel, a device for automatically starting and stopping the pump, said device controlling and being operated by the level of liquid in the said mixing-vessel, a mixing device arranged within said primary mixing-vessel, a secondary mixing vessel, a pipe connecting the primary and secondary mixing vessels, a mixing-device arranged within the secondary mixing-vessel, a distributing device provided with outlet valves through which the liquid is drawn off for use, a counterbalanced rock-shaft, a vessel attached to said rock shaft and connected with the primary mixing-vessel by flexible tubes, and a second vessel attached to said rock shaft and connected with the secondary mixing-vessel by flexible tubes, whereby the level of the liquid in the said secondary mixing-vessel is controlled, and gas from the primary mixing vessel admitted intermittingly to the secondary mixing-vessel, substantially as set forth.

Witness our hands this 26th day of December, A. D. 1893.

JOHN MACKSEY.
WILLIAM HELMER.
GEORGE E. BARTON.

In presence of—
P. E. TESCHEMACHER,
FRANK T. McHUGH.